United States Patent
Zhuo (10) Patent No.: US 11,294,875 B2
(45) Date of Patent: Apr. 5, 2022

(54) DATA STORAGE ON TREE NODES

(71) Applicant: Advanced New Technologies Co., Ltd., George Town (KY)

(72) Inventor: Haizhen Zhuo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/776,685

(22) Filed: Jan. 30, 2020

(65) Prior Publication Data
US 2020/0169402 A1 May 28, 2020

Related U.S. Application Data

(63) Continuation of application No. PCT/CN2020/072007, filed on Jan. 14, 2020.

(30) Foreign Application Priority Data

May 31, 2019 (CN) .......................... 201910468704.4

(51) Int. Cl.
*G06F 16/22* (2019.01)
*G06F 16/23* (2019.01)
*G06F 16/901* (2019.01)

(52) U.S. Cl.
CPC ...... *G06F 16/2246* (2019.01); *G06F 16/2365* (2019.01); *G06F 16/9027* (2019.01)

(58) Field of Classification Search
None
See application file for complete search history.

(56) References Cited

U.S. PATENT DOCUMENTS

| 10,075,298 B2 | 9/2018 | Struttmann |
| 10,121,019 B2 | 11/2018 | Struttmann |

(Continued)

FOREIGN PATENT DOCUMENTS

| CN | 101322136 | 7/2012 |
| CN | 105719185 | 6/2016 |

(Continued)

OTHER PUBLICATIONS

Niall Moore, "Modifying the Merkle Patricia Trie", Mar. 20, 2019, https://medium.com/datadriveninvestor/modifying-the-merkle-patricia-trie-4b15813d8e6b (Year: 2019).*

(Continued)

*Primary Examiner* — Neveen Abel Jalil
*Assistant Examiner* — John J Morris
(74) *Attorney, Agent, or Firm* — Fish & Richardson P.C.

(57) ABSTRACT

A computer-implemented method for storing blockchain data includes: obtaining, by a blockchain node, a first key-value pair corresponding to data to be stored, in which the first key-value pair includes a value of the data to be stored and a first key of the data to be stored; identifying, based on the first key, a corresponding leaf node in a tree data organization structure; and modifying, by the blockchain node, the first key, to update the first key-value pair to obtain an updated key-value pair including the value of the data to be stored and the modified first key, and storing the updated key-value pair into a conflict data storage structure corresponding to the identified leaf node.

21 Claims, 9 Drawing Sheets

(56) References Cited

U.S. PATENT DOCUMENTS

| | | | |
|---|---|---|---|
| 10,193,696 B2 | 1/2019 | Struttmann et al. | |
| 10,261,711 B1 | 4/2019 | Pasirstein | |
| 2011/0246503 A1* | 10/2011 | Bender | G06F 16/258 |
| | | | 707/769 |
| 2012/0310882 A1* | 12/2012 | Werner | H04L 67/1095 |
| | | | 707/624 |
| 2016/0110292 A1* | 4/2016 | Choi | G06F 16/9014 |
| | | | 711/103 |
| 2016/0203053 A1* | 7/2016 | Talagala | G06F 12/00 |
| | | | 714/6.12 |
| 2017/0300553 A1* | 10/2017 | Keene | G06F 16/275 |
| 2018/0205552 A1* | 7/2018 | Struttmann | G06F 16/9024 |
| 2018/0268162 A1 | 9/2018 | Dillenberger | |
| 2020/0110821 A1* | 4/2020 | Chan | G06F 16/2379 |
| 2020/0363994 A1* | 11/2020 | Jing | H04L 9/3236 |

FOREIGN PATENT DOCUMENTS

| | | |
|---|---|---|
| CN | 106055597 | 10/2016 |
| CN | 106126722 | 11/2016 |
| CN | 106815258 | 6/2017 |
| CN | 103297413 | 2/2018 |
| CN | 108197226 | 6/2018 |
| CN | 108282474 | 7/2018 |
| CN | 108595538 A | 9/2018 |
| CN | 108615156 | 10/2018 |
| CN | 108959563 | 12/2018 |
| CN | 109165221 | 1/2019 |
| CN | 107332847 | 4/2019 |
| CN | 109559234 | 4/2019 |
| CN | 109684325 | 4/2019 |
| CN | 108446376 | 8/2019 |
| CN | 110275884 | 9/2019 |
| CN | 108595538 B | 5/2020 |
| TW | 201916629 | 4/2019 |
| WO | WO 2018031940 | 2/2018 |
| WO | WO2018121319 | 7/2018 |
| WO | WO 2018124716 | 7/2018 |
| WO | WO 2018194351 | 10/2018 |
| WO | WO2019063995 | 4/2019 |

OTHER PUBLICATIONS

Kiyun Kim, "Modified Merkle Patricia Trie—How Ethereum saves a state", Jun. 26, 2018, https://medium.com/codechain/modified-merkle-patricia-trie-how-ethereum-saves-a-state-e6d7555078dd (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Tan, "Research and Implementation of Network Log Management and Analysis Technology," China Master's Theses Full-text Database, Oct. 2015, 10:7-8, 17-18 (with machine translation).

PCT International Search Report and Written Opinion in International Application No. PCT/CN2020/072007, dated Apr. 13, 2020, 11 pages (with English translation).

* cited by examiner

DATA STORAGE ON TREE NODES

CROSS-REFERENCE TO RELATED APPLICATIONS

This application is a continuation of PCT Application No. PCT/CN2020/072007, filed on Jan. 14, 2020, which claims priority to Chinese Patent Application No. 201910468704.4, filed on May 31, 2019, and each application is hereby incorporated by reference in its entirety.

TECHNICAL FIELD

One or more implementations of the present specification relate to the field of terminal technologies, and in particular, to a data storage method and nodes.

BACKGROUND

A blockchain technology, also known as a distributed ledger technology, is a decentralized or distributed database technology. The blockchain technology features decentralization, openness and transparency, tamper-proofness, and trustiness, and is applied to many application scenarios in which there is a high requirement on data reliability.

SUMMARY

In view of this, one or more implementations of the present specification provide a data storage method and device.

To achieve the previous object, one or more implementations of the present specification provide the following technical solutions:

According to a first aspect of one or more implementations of the present specification, a data storage method is provided, including: obtaining, by a blockchain node, a first key-value pair corresponding to data to be stored, where the first key-value pair includes a value and a first key of the data to be stored; identifying, by the blockchain node, a corresponding leaf node in a tree data structure based on the first key, where a value of a non-leaf node in the tree data organization structure is a hash value obtained through calculation based on child leaf nodes; and when the identified leaf node is not associated with an existing value, associating, by the blockchain node, the value of the data to be stored with the identified leaf node, so that a value of the identified leaf node is a hash value that is obtained through calculation based on the value of the data to be stored; or when the identified leaf node is associated with an existing value, modifying, by the blockchain node, the first key, to update the first key-value pair to obtain an updated key-value pair, and storing the updated key-value pair into a conflict data storage structure corresponding to the identified leaf node, so that a value of the identified leaf node is a hash value that is obtained through calculation based on the value of the data to be stored and the existing value.

According to a second aspect of one or more implementations of the present specification, a data storage node is provided, including: an acquisition unit, configured to obtain, by a blockchain node, a first key-value pair corresponding to data to be stored, where the first key-value pair includes a value and a first key of the data to be stored; a determining unit, configured to identify, by the blockchain node, a corresponding leaf node in a tree data organization structure based on the first key, where a value of a non-leaf node in the tree data organization structure is a hash value obtained through calculation based on child leaf nodes; an associating unit, configured to: when the leaf node identified by the blockchain node is not associated with an existing value, associate the value of the data to be stored with the identified leaf node, so that a value of the identified leaf node is a hash value that is obtained through calculation based on the value of the data to be stored; a modification unit, configured to: when the leaf node identified by the blockchain node is associated with an existing value, modify the first key, to update the first key-value pair to obtain an updated key-value pair; and a storing unit, configured to store the updated key-value pair into a conflict data storage structure corresponding to the identified leaf node, so that a value of the identified leaf node is a hash value that is obtained through calculation based on the value of the data to be stored and the existing value.

According to a third aspect of one or more implementations of the present specification, an electronic device is provided, including: a processor; and a memory, configured to store a processor executable instruction; where the processor executes the executable instruction to implement the method according to the first aspect.

According to a fourth aspect of one or more implementations of the present specification, a computer readable storage medium is provided, where the medium stores a computer instruction, and when the computer instruction is executed by a processor, steps of the method according to the first aspect are implemented.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent a same or similar elements. Implementations described in the following example implementations do not represent implementations consistent with one or more implementations of the present specification. On the contrary, they are only examples of devices and methods that are described in the appended claims in detail and that are consistent with some aspects of one or more implementations of the present specification.

It is worthwhile to note that, in other implementations, the steps of corresponding methods are not necessarily performed in an order shown and illustrated in the present specification. In some other implementations, the method may include more or fewer steps than those described in the present specification. In addition, a single step described in the present specification may be decomposed into a plurality of steps in other implementations for description; and a plurality of steps described in the present specification may be combined into a single step in other implementations for description.

Figure 1:
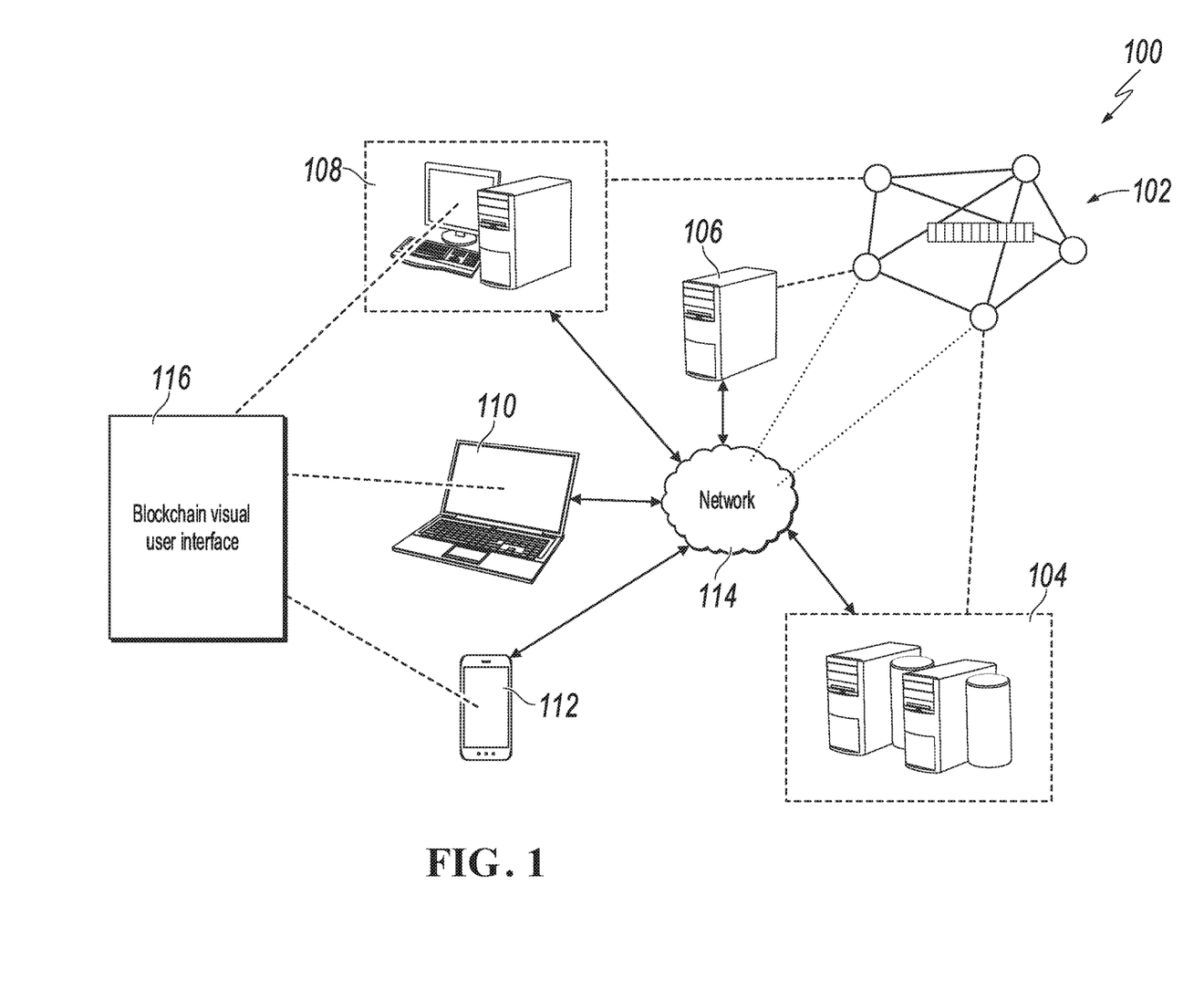
FIG. 1 is a schematic diagram illustrating an example environment, according to an example implementation of the present specification.

FIG. 1 is a schematic diagram illustrating an example environment, according to an example implementation of the present specification. As shown in FIG. 1, the example environment 100 allows entities to participate in a blockchain network 102. The blockchain network 102 can be a public blockchain network, a private blockchain network, or a consortium blockchain network. The example environment 100 can include computing devices 104, 106, 108, 110, and 112 and a network 114. In an implementation, the network 114 can include a local area network (LAN), a wide area network (WAN), the Internet, or a combination thereof, and is connected to a website, a user device (for example, a computing device), and a back-end system. In some implementations, the network 114 can be accessed in a wired communication manner and/or a wireless communication manner.

In some cases, the computing devices 106 and 108 can be nodes in a cloud computing system (not shown); or each of the computing devices 106 and 108 can be an independent cloud computing system, which includes a plurality of computers that are interconnected through a network and that are used as a distributed processing system.

In some implementations, the computing devices 104 to 108 can run any suitable computing systems, so that the computing devices can serve as nodes in the blockchain network 102. For example, the computing devices 104 to 108 can include but are not limited to servers, desktop computers, notebook computers, tablet computers, and smartphones. In some implementations, the computing devices 104 to 108 can belong to related entities and are configured to implement a corresponding service, for example, the service can be used to manage transactions of an entity or between a plurality of entities.

In some entities, the computing devices 104 to 108 each stores a respective blockchain ledger corresponding to the blockchain network 102. The computing device 104 can be (or includes) a network server that provides a browser function, and the network server can provide visual information related to the blockchain network 102 based on the network 114. In some cases, the computing device 104 may not participate in block verification; instead, the computing device 104 monitors the blockchain network 102, to determine when other nodes (for example, the computing devices 106 to 108) reach a consensus, and based on this, generate a corresponding blockchain visual user interface.

In some implementations, the computing 104 can receive a request specific to the blockchain visual user interface that is initiated by a client (for example, the computing device 110 or 112). In some cases, a node in the blockchain network 102 can also serve as a client. For example, a user of the computing device 108 can send the previous request to the computing device 104 by using a browser running on the computing device 108.

In response to the previous request, the computing device 104 can generate a blockchain visual user interface (for example, a web page) based on a stored blockchain ledger, and send the generated blockchain visual user interface to the requesting client. If the blockchain network 102 is a private blockchain network or a consortium blockchain network, the request specific to the blockchain visual user interface can include user permission information; and before the blockchain visual user interface is generated and sent to the requesting client, the computing device 104 can verify the user permission information, and return the corresponding blockchain visual user interface after the user permission information is verified successfully.

The blockchain visual user interface can be displayed on a client (for example, the blockchain visual user interface can be displayed on a user interface 116 shown in FIG. 1). When a blockchain ledger is updated, the content displayed on the user interface 116 is also updated accordingly. In addition, interaction between a user and the user interface 116 may lead to a request specific to another user request, for example, a display block list, block details, transaction details, an account list, account details, a contract list, contract details, or a search result page generated when a user searches a blockchain network.

Figure 2:
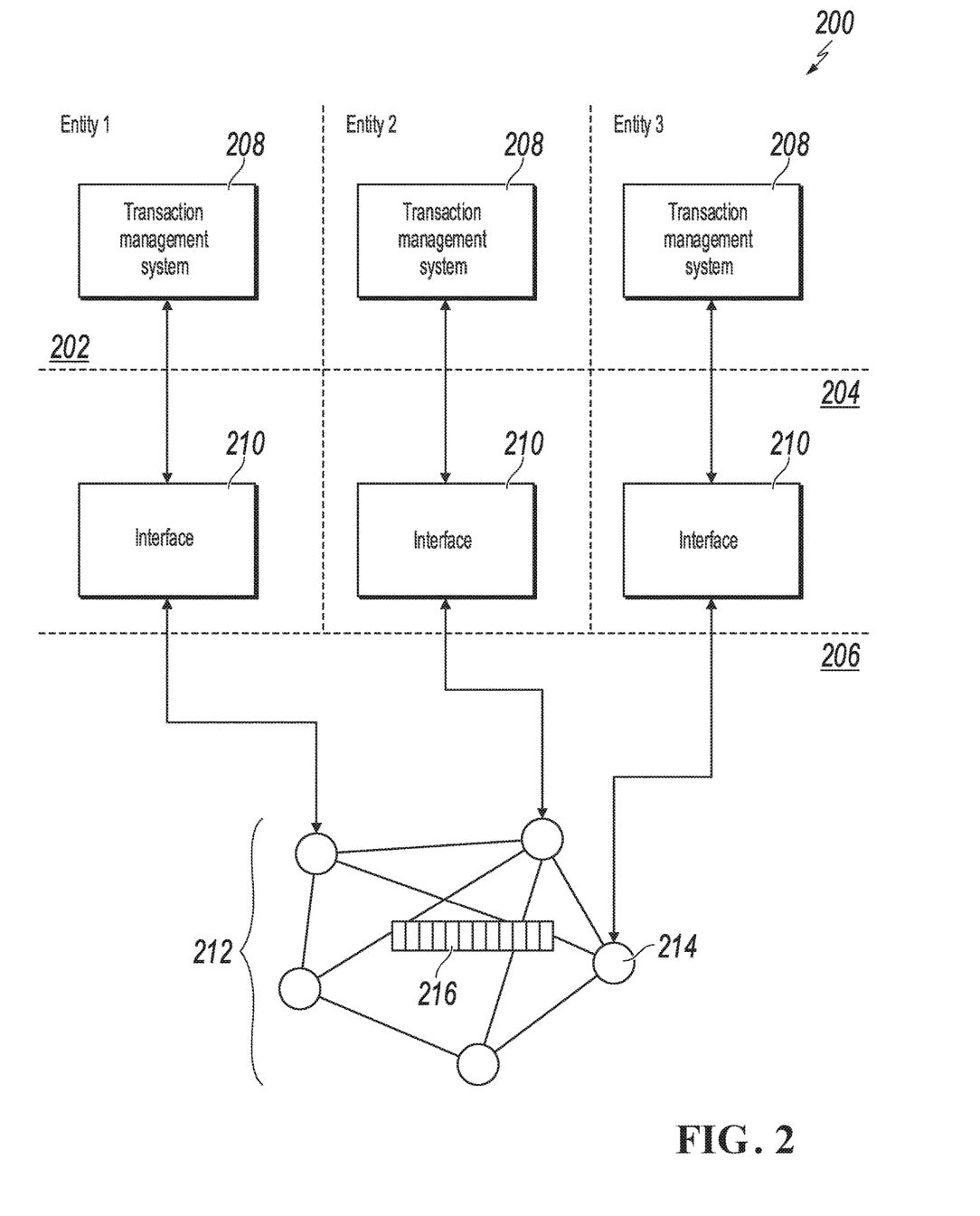
FIG. 2 is a schematic diagram illustrating an conceptual architecture, according to an example implementation of the present specification.

FIG. 2 is a schematic diagram illustrating a conceptual architecture, according to an example implementation of the present specification. As shown in FIG. 2, the conceptual architecture 200 includes an entity layer 202, a hosting service layer 204, and a blockchain network layer 206. For example, the entity layer 202 can include three entities: entity 1, entity 2, and entity 3; and each entity has a respective transaction management system 208.

In an implementation, the hosting service layer 204 can include an interface 210 corresponding to each transaction management system 208. For example, each transaction management system 208 communicates with a respective interface 210 through a network (for example, the network 114 in FIG. 1) by using a protocol (for example, Hypertext Transfer Protocol Secure (HTTPS). In some examples, each interface 210 can provide a communication connection between a respective transaction management system 208 corresponding to the interface 210 and the blockchain network layer 206. More specifically, the interface 210 can communicate with a blockchain network 212 at the blockchain network layer 206. In some examples, communication between the interface 210 and the blockchain network layer 206 can be implemented through remote procedure calls (RPCs). In some examples, the interface 210 can provide, to the transaction management system 208, an API for accessing a blockchain network 212.

As described in the present specification, the blockchain network 212 is provided in a form of a peer-to-peer network. The peer-to-peer network includes a plurality of nodes 214, and these nodes 214 are respectively used to make a blockchain ledger 216 generated based on blockchain data persistent. FIG. 2 shows only one blockchain ledger 216, but the blockchain network 212 can include a plurality of blockchain ledgers 216 or a plurality of copies of the blockchain ledger 216, for example, each node 214 can maintain one blockchain ledger 216 or at least one copy of the blockchain ledger 216.

It is worthwhile to note that the transaction described in the present specification refers to a group of data that is created by a user through a blockchain and that needs to be finally sent to a distributed database in the blockchain. A transaction in the blockchain has a narrow sense and a broad sense. A transaction in a narrow sense refers to a value transfer initiated to a user to the blockchain. For example, in a conventional bitcoin blockchain network, a transaction can be a transfer initiated by a user in the blockchain. A transaction in a broad sense refers to a group of data that is issued by a user to the blockchain and that includes a service intention. For example, an operator can build a consortium blockchain based on an actual service requirement, and deploy some online services unrelated to value transfer based on the consortium blockchain, such as house renting service, vehicle dispatching service, insurance claim settlement service, credit service, and medical service. In such a consortium blockchain, a transaction can be a service message or service request that is issued by a user in the consortium blockchain and that includes a service intention.

Figure 3:
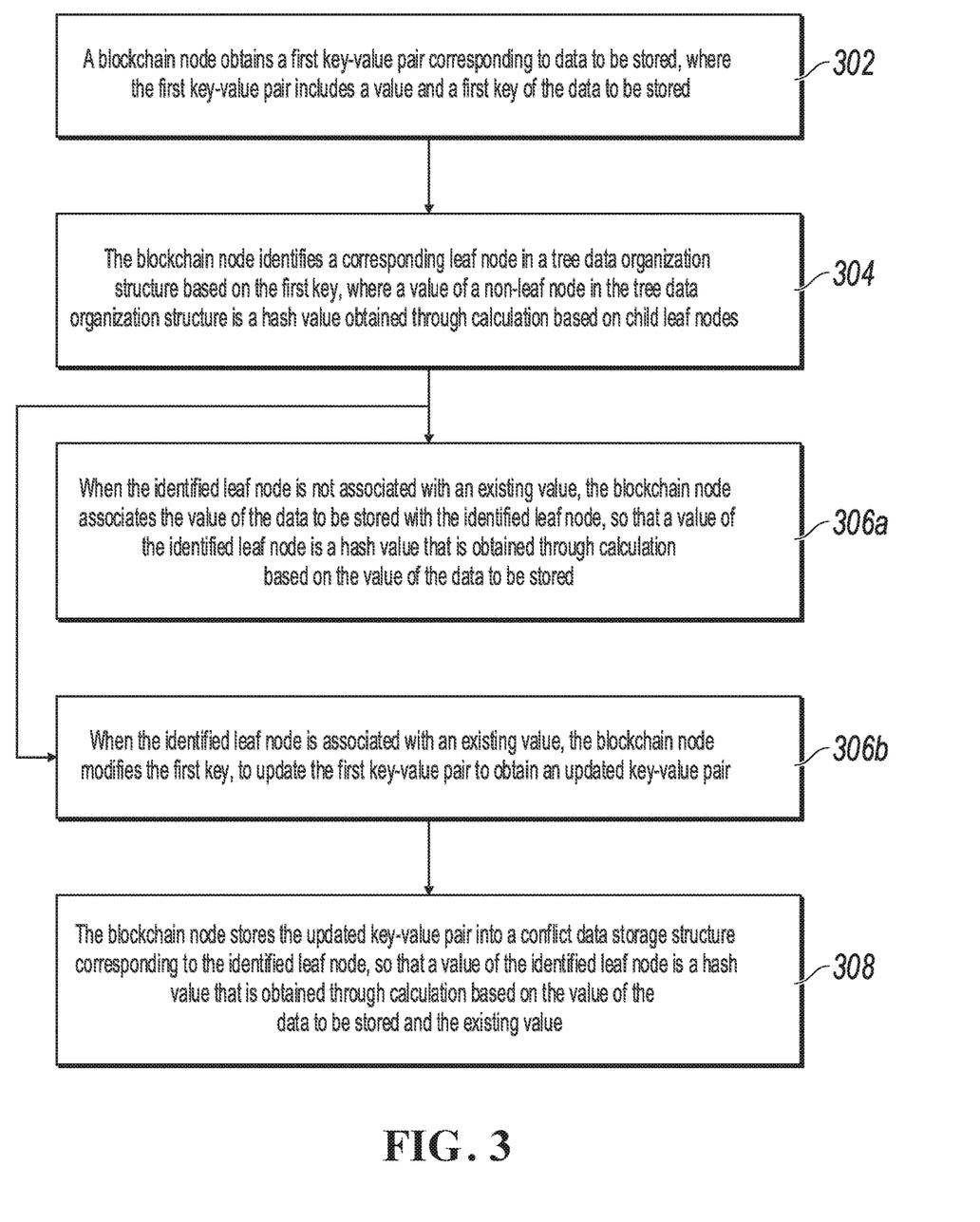
FIG. 3 is a schematic diagram illustrating a data storage method, according to an example implementation of the present specification.

FIG. 3 is a schematic diagram illustrating a data storage method, according to an example implementation of the present specification. As shown in FIG. 3, the method can include the following steps.

Step 302: A blockchain node obtains a first key-value pair corresponding to data to be stored, where the first key-value pair includes a value and a first key of the data to be stored.

In an implementation, for a public blockchain, a private blockchain, a consortium blockchain, or any combination thereof (for example, a private blockchain+a consortium blockchain, or a consortium blockchain+a public blockchain), in a data storage process, nodes in the blockchain network (blockchain nodes) can organize the stored data in a specified form, for example, in a tree data organization structure.

The public blockchain is used as an example. The public blockchain is represented by the bitcoin blockchain and the Ethereum blockchain. For example, in the Ethereum blockchain network, a blockchain node runs an Ethereum virtual machine (EVM), and executes code of a smart contract in the EVM to implement complex processing logic. Several contract states are defined in the code of the smart contract, and values of these contract states can change after the code is executed. Therefore, the blockchain node in the Ethereum network organizes and stores the values of all contract states based on the MPT data organization structure, and records a root hash value formed at the root node of the MPT into the block head, so that the root hash value can be used to verify the contract states and the values of the contract states.

In an implementation, the data to be stored in the present specification can include the previous contract state. Of course, other type of data can be used in another implementation, for example, a receipt that is generated after execution of a smart contract. This is not limited in the present specification.

In an implementation, the blockchain node is preconfigured with a unified key-value pair generation rule, and a corresponding key can be set a value of the data to be stored. For example, the blockchain nodes can directly set, based on the key-value pair generation rule, the previous first key for a value of the data to be stored.

For example, the blockchain node can generate, based on the key-value pair generation rule, a corresponding initial key-value pair for the data to be stored, where the initial key-value pair includes a value and an initial key of the data to be stored; and then the blockchain node can select a character in a particular position in the initial key to form the first key, where a length of the first key is less than that of the initial key, to obtain the first key-value pair. For example, in the Ethereum blockchain network, a smart contract model defines that a length of a key of a contract value is 32 bytes and that a length of a value is 32 bytes, that is, the length of an initial key is 32 bytes. In this case, the initial key of the first key can be the first 16 bytes (that is, the previous particular position), that is, the length of the first key is 16 bytes. Of course, in other implementations, another "particular position can be selected, and the first key can be of a different length. This is not limited in the present specification. Similarly, in the previous implementation in which the first key is directly generated based on the key-value pair generation rule, a first key with a length of 16 bytes can be directly generated.

Assuming that in the initial key-value pair corresponding to the data to be stored, the value of the data to be stored is 32 bytes, and the length of the initial key is 32 bytes. Then, the initial key-value pair occupies a storage space of 64 bytes. However, the initial key is processed into the previous first key, and the length of the first key is 16 bytes, so that the first key-value pair occupies a storage space of 48 bytes, which is 16 bytes less than the storage space occupied by the initial key-value pair. When the blockchain node organizes and stores more data, if a shorter first key is used, the storage space occupied on the node can be significantly reduced compared with a longer initial key or another key, and the retrieval performance can be improved.

Step 304: The blockchain node identifies a corresponding leaf node in a tree data organization structure based on the first key, where a value of a non-leaf node in the tree data organization structure is a hash value obtained through calculation based on child leaf nodes.

In an implementation, the tree data organization structure includes several layers downward starting from the root node on the top, and each layer includes several nodes, until bottom leaf nodes are formed. A value of each node is a hash value. A value of a leaf node is a hash value obtained through calculation based on associated data; and a value of a non-leaf node is a hash value obtained through calculation based on child leaf nodes, until a hash value corresponding to the root node (that is, the root hash value) is obtained through calculation. Therefore, based on the values of the nodes, the tree data organization has characteristics of a Merkle tree.

In an implementation, each node in the tree data organization structure has a corresponding node label; and on a path from a root node to the identified leaf node, a combination value formed by sequentially combining node labels corresponding to all nodes is equal to the first key. Therefore, the blockchain node can determine, based on the first key corresponding to the data to be stored and starting from top root node in the tree data organization structure, nodes corresponding to each level, until corresponding leaf nodes are identified. Therefore, based on the correspondence between a path and a key, the tree data organization structure has characteristics of a dictionary tree. For example, a prefix tree (Trie), a compressed prefix tree (Patricia trie), or a similar structure can be used.

In an implementation, the tree data organization structure can combine characteristics of the Merkle tree and the dictionary tree. For example, based on the structure of the dictionary tree, values of the nodes can show the characteristics of the Merkle tree, so that a node path matches a key, and a hash value corresponding to each node can be determined upward starting from a leaf node. For example, the tree data organization structure can be a Merkle Patricia tree (MPT); or, the tree data organization structure can be another similar structure.

Step 306a: When the identified leaf node is not associated with an existing value, the blockchain node associates the value of the data to be stored with the identified leaf node, so that a value of the identified leaf node is a hash value that is obtained through calculation based on the value of the data to be stored.

In an implementation, if the identified leaf node is not associated with an existing value, the value of the data to be stored can be associated with the leaf node, so that the value of the leaf node is temporarily a hash value corresponding to the value of the data to be stored. In addition, for other data of the leaf node that is subsequently determined based on the previous steps 302 to 304, the value of the data to be stored is an existing value associated with the leaf node relative to the other data that is subsequently determined, and step 306b needs to be performed.

Step 306b: When the identified leaf node is associated with an existing value, the blockchain node modifies the first key, to update the first key-value pair to obtain an updated key-value pair.

In an implementation, because the blockchain node determines a leaf node based on a first key corresponding to the data to be stored, when the leaf node is associated with an existing value, it indicates that a key corresponding to the existing value is the same as the first key. Therefore, the first key can be modified, so that the key in an updated key-value pair is different from the key corresponding to the existing value, so as to distinguish between the data to be stored and the existing value and avoid confusion.

In an implementation, if the first key is formed by a particular position included in the previous initial key, when the first key is modified, the first key can be restored to the initial key, that is, the updated key-value pair is the previous initial key-value pair. Of course, the first key can alternatively modified to another value different from the previous initial key, provided that the first key can be distinguished from the a key corresponding to an existing value. This is not limited in the present specification.

Step 308: The blockchain node stores the updated key-value pair into a conflict data storage structure corresponding to the identified leaf node, so that a value of the identified leaf node is a hash value that is obtained through calculation based on the value of the data to be stored and the existing value.

In an implementation, if the leaf node identified based on the data to be stored is associated with an existing value, it indicates that there is a data conflict between the data to be stored and the existing value. However, each leaf node can be associated with only one value. Therefore, a corresponding conflict data storage structure can be set for each leaf node, so that when a data conflict occurs, data can be stored in the conflict data storage structure. The amount of data in the conflict data storage structure is not limited, and all data stored in the conflict data storage structure are determined as associated with corresponding leaf nodes, so that the amount of data that can be associated with a leaf node is increased. Therefore, when a key-value pair is stored in the conflict data storage structure, it means that the value in the key-value pair is directly associated with a corresponding leaf node.

In an implementation, for a leaf node that is identified based on data to be stored, a corresponding existing value can include an existing value that is directly associated with the leaf node at a historical time, or can include an existing key-value pair that is recorded in the conflict data storage structure at a historical time. An existing key included in the existing key-value pair is different from a key included in the updated key-value pair.

When there is only one existing value, the existing value is usually an existing value that is directly associated with the leaf node. Of course, in the present specification, the existing value can alternatively be an existing key-value pair in the conflict data storage structure. Where there are a plurality of existing values, each of the existing values can be an existing key-value pair in the conflict data storage structure; alternatively, the earliest existing value is an existing value that is directly associated with the leaf node, and each of other existing values is an existing key-value pair in the conflict data storage structure.

In an implementation, when there is an existing value that is directly associated with a leaf node and there is a key-value pair (an existing key-value pair or the previous updated key-value pair) that is stored in a data storage structure, unless an order between the data is predefined, when a corresponding hash value is generated based on the data, the hash value may vary with the order, that is, the hash value is not stable.

Therefore, the blockchain node can delete the existing value that is associated with the identified leaf node, and record a second key-value pair corresponding to the existing value in the conflict data storage structure, where the second key-value pair includes the existing value and a second key, and the second key is different from a key included in another key-value pair in the conflict data storage structure. Then, because all key-value pairs in the conflict data storage structure are sequentially arranged in a preset order, for example, in an order in which the values are generated or in an order of sizes of values, hash values of corresponding leaf nodes can be generated in the order, and a stable hash value can be obtained.

In an implementation, the conflict data storage structure can be tree data organization structure, for example, a Merkle tree. Alternatively, the conflict data storage structure can be a table structure. Alternatively, a conflict data storage structure in another form can be used. This is not limited in the present specification.

Figure 4:
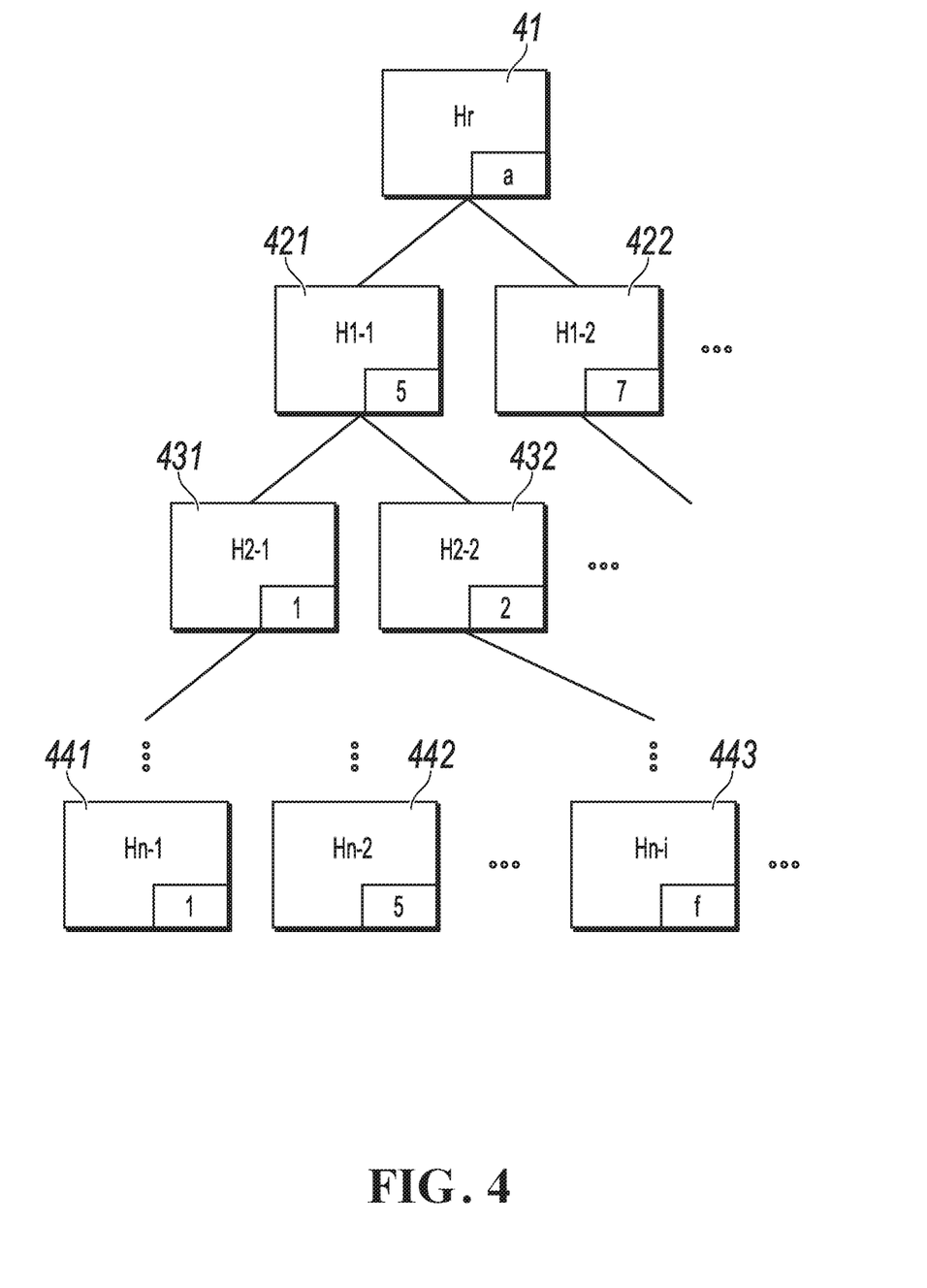
FIG. 4 is a schematic diagram illustrating a tree data organization structure, according to an example implementation of the present specification.

FIG. 4 is a schematic diagram illustrating a tree data organization structure, according to an example implementation of the present specification. Assuming that the blockchain nodes are organized based on the tree data organization structure shown in FIG. 4, the top layer of the tree data organization structure includes root node 41; other layers include several nodes, for example, leaf nodes of the root node 41 include node 421, node 422, etc., and leaf nodes of the node 421 include node 431, node 432, etc.; the bottom layer includes several leaf nodes, for example, node 441, node 442, node 443, etc. Except leaf nodes, each of other nodes include one or more leaf nodes, and the quantity of the leaf nodes is determined according to an actual scenario. This is not limited in the present specification.

As described above, the tree data organization structure inherits characteristics of a dictionary tree, and a key in a corresponding key-value pair can be represented by a path. For example, a node corresponding to the root node 41 is denoted as a, a node corresponding to the node 421 is denoted as 5, a node corresponding to the node 422 is denoted as 7, a node corresponding to the node 431 is denoted as 1, a node corresponding to the node 432 is denoted as 2, a node corresponding to the node 441 is denoted as 1, a node corresponding to the node 442 is denoted as 5, and a node corresponding to the node 443 is denoted as f Assuming that the leaf node 441 corresponds to the node 431, a path "a-5-1-....-1" can be formed from the root node 41 to the node 441. Assuming that the leaf node 442 corresponds to the node 432, a path "a-5-2-....-5" can be formed from the root node 41 to the node 442. Assuming that the leaf node 443 corresponds to the node 432, a path "a-5-2-....-f" can be formed from the root node 41 to the node 443.

As described above, the tree data organization structure inherits characteristics of the Merkle tree, and the value of each node is a hash value. For a leaf node, the hash value is obtained through calculation based on a value associated with the leaf node. For example, the value of the node 441 is a hash value Hn-1, and the hash value Hn-1 is a hash value that is obtained through calculation based on the value associated with the node 441; the value of the node 442 is a hash value Hn-2, and the hash value Hn-2 is a hash value that is obtained through calculation based on the value associated with the node 442; and the value of the node 443 is a hash value Hn-3, and the hash value Hn-3 is a hash value that is obtained through calculation based on the value associated with the node 443. For a non-leaf node, the hash value is obtained through calculation based on child leaf nodes. For example, the value of the root node 41 is a hash value Hr, and the lower-level nodes of the root node 41 include the node 421 and the node 422, the hash value Hr is a hash value that is obtained through calculation based on the value of the node 421 and the value of the node 422; for example, the hash value H1-1 corresponding to the node 421 and the hash value H1-2 corresponding to the node 422 are combined to form a character string, and a hash value that is obtained through calculation based on the character string is used as the previous hash value Hr. For example, the value of the root node 421 is a hash value H1-1, and the lower-level nodes of the root node 421 include the node 431 and the node 432, the hash value H1-1 is a hash value that is obtained through calculation based on the value of the node 431 and the value of the node 432; for example, the hash value H2-1 corresponding to the node 431 and the hash value H2-2 corresponding to the node 432 are combined to form a character string, and a hash value that is obtained through calculation based on the character string is used as the previous hash value H1-1.

After the blockchain node executes a smart contract invoked by a transaction, assuming that a value of a contract state Z1 defined in the smart contract changes, the blockchain node needs to store the value of the contract state Z1 into the tree data organization structure shown in FIG. 4. The blockchain node first generates a corresponding key-value pair for the contract state Z1.

For the Ethereum blockchain network, as described above, a length of the key in the key-value pair generated by the blockchain is 32 bytes, and a length of the value is 32 bytes. However, in the present specification, the blockchain node can first generate an initial key-value pair in a similar way, including an initial key K1' and a value V1; that is, the key-value pair is K1'-V1, where a length of K1' is 32 bytes, and a length of V1 is 32 bytes. Then, the blockchain node can convert the initial key K1', for example, select the first 16 bytes to form a new key K1, so as to form a new key-value pair K1-V1. Then, when the blockchain node stores the contract state Z1, the key-value pair K1-V1 needs to occupy only a storage space of 48 bytes, which is less than a storage space of 64 bytes that need to be occupied by the key-value pair K1'-V1.

For the key-value pair K1-V1 of the contract state Z1, the blockchain node identifies, based on K1, a corresponding leaf node in the tree data organization structure shown in FIG. 4. For example, when the value of K1 is a52...f, assuming that the value of K1 matches a path from the root node 41 to the leaf node 443, it can be determined that K1 corresponds to the leaf node 443.

Figure 5:
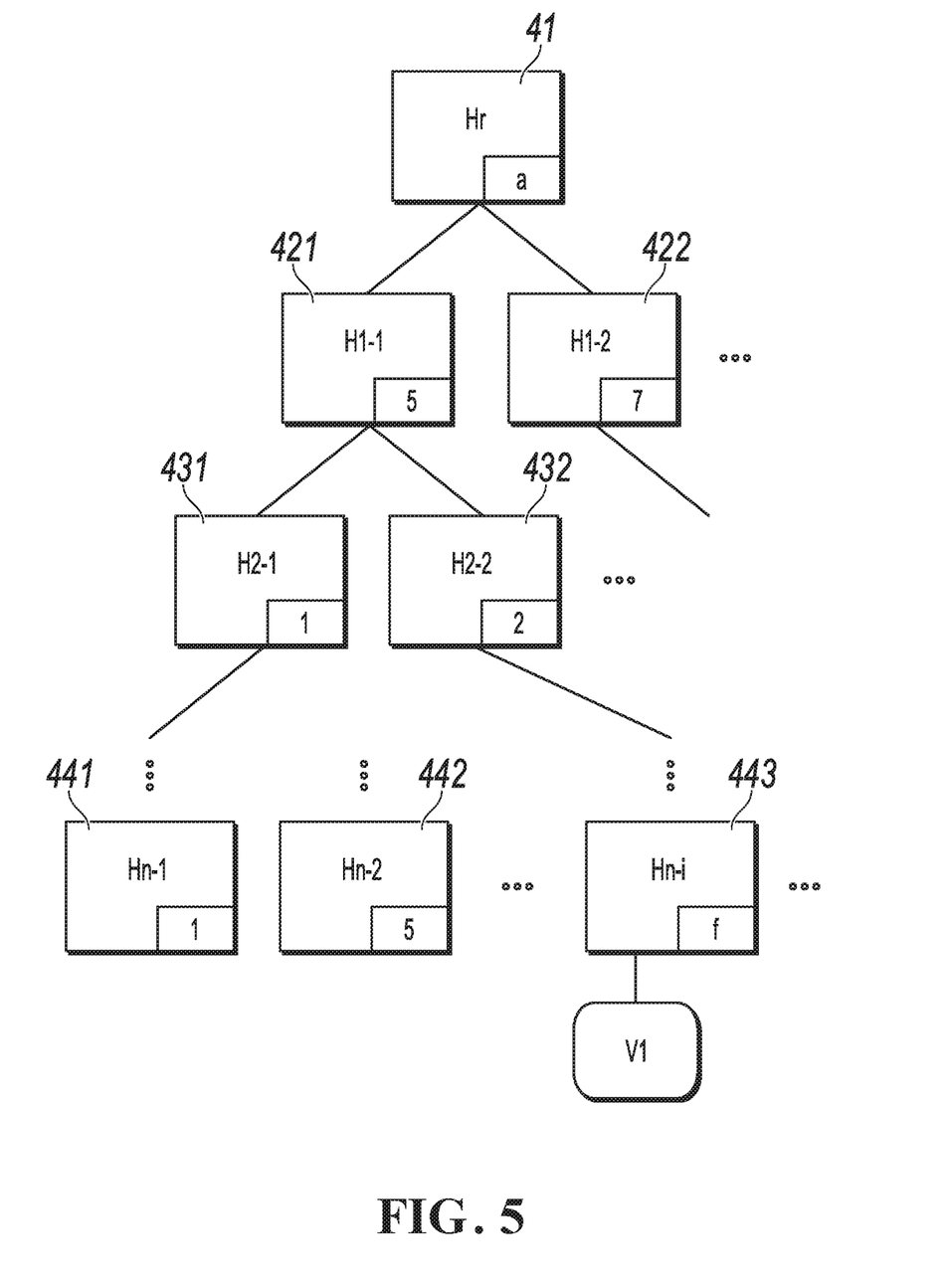
FIG. 5 is a schematic diagram illustrating associating a value with a leaf node, according to an example implementation of the present specification.

Assuming that the leaf node 443 is not associated with an existing value, the blockchain node can directly associate the value V1 of the contract state Z1 with the leaf node 443, as shown in FIG. 5. In this case, the hash value Hn-i corresponding to the leaf node 443 is obtained through calculation based on the value V1.

After the contract state Z1 is stored, assuming that the blockchain node executes a smart contract invoked by a transaction and a value of a contract state Z2 defined in the smart contract changes, the blockchain node needs to store the value of the contract state Z2 into the tree data organization structure shown in FIG. 5.

The storage process of the contract state Z2 is similar to the storage process of the contract state Z1. The blockchain node generates an initial key-value pair K2'-V2 for the contract state Z2, and select the first 16 bytes of the initial key K2' to form a new key K2, so as to form a new key-value pair K2-V2 of the contract state Z2. Then, the blockchain node identifies, based on the key K2, a corresponding leaf node in the tree data organization structure shown in FIG. 5.

Assuming that the value of K2 is a52...f, which is the same as the value of K1, the blockchain node can determine that a corresponding leaf node is the node 443. Then, for the contract state Z2, the node 443 is associated with an existing value, that is, the node 443 is associated with the existing value V1. Therefore, the storage process of the contract state Z2 is different from the storage process of the contract state Z1.

Figure 6:
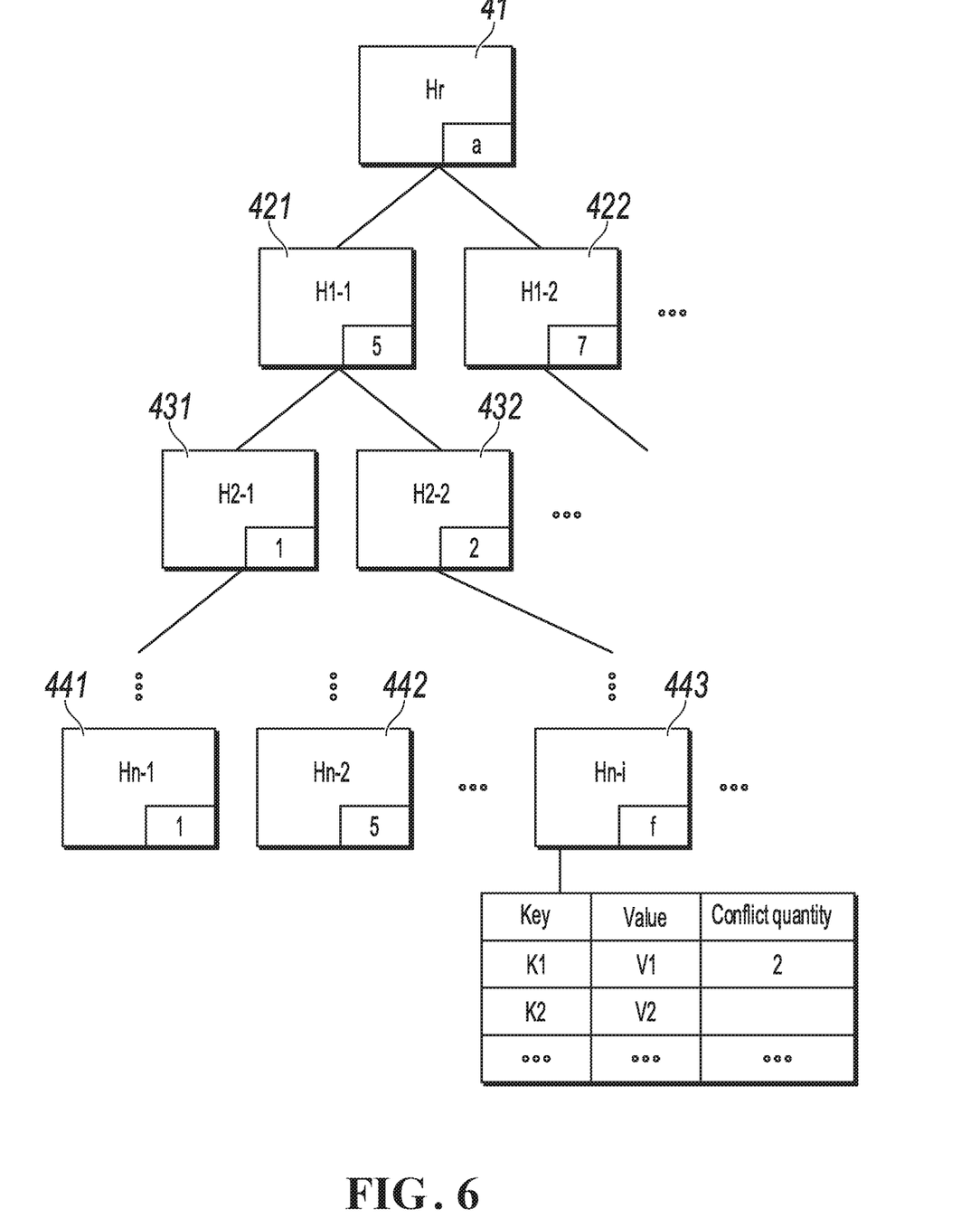
FIG. 6-7 is a schematic diagram illustrating recording a key-value pair in a conflict data storage table corresponding to a leaf node, according to an example implementation of the present specification.

The blockchain node can create a conflict data storage table for the node 443, for example, the conflict data storage table shown in FIG. 6. The blockchain node can create the conflict data storage table when the node 443 is created. Alternatively, the blockchain node can create the conflict data storage table when a data conflict occurs, for example, during the storage process of the contract Z2.

The processing process performed by the blockchain node includes two aspects: In one aspect, the blockchain node deletes the existing value V1 that is associated with the leaf node 443. In another aspect, the blockchain node restores the key-value pair corresponding to the contract state Z1 to the initial key-value pair K1-V1, restores the key-value pair corresponding to the contract state Z2 to the initial key-value pair K2-V2, and stores the initial key-value pairs K1-V1 and K2-V2 respectively into conflict data storage tables corresponding to the node 443. For example, as shown in FIG. 6, the primary keys of the conflict data storage table can include "key" and "value", and correspondingly, the blockchain node can write K1-V1 and K2-V2. The primary keys of the conflict data storage table can further include "conflict quantity", and the blockchain node can write the total quantity of the conflicting key-value pairs, for example, 2 in the previous case.

Figure 7:
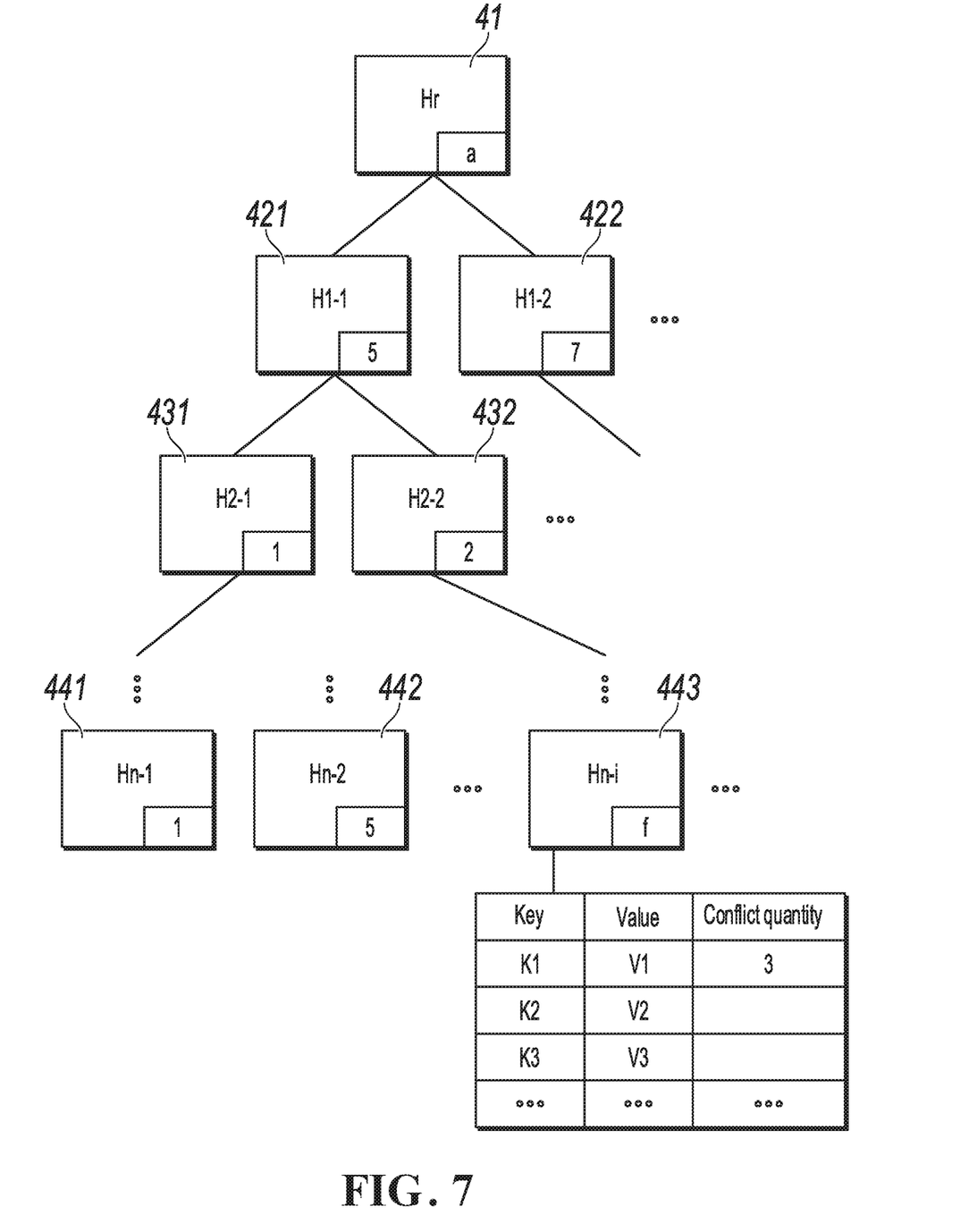

Similarly, when the blockchain node subsequently generates a contract state Z3 that matches the leaf node 443, because the key-value pairs K1-V1 and K2-V2 have been stored in the conflict data storage table corresponding to the node 443, as shown in FIG. 7, the blockchain node only needs to generate the initial key-value pair K3-V3 corresponding to the contract state Z3 and record the key-value pair K3-V3 in the conflict data storage table corresponding to the node 443. The blockchain node also updates the value of "conflict quantity" to 3.

In the conflict data storage table, the key-value pairs are sequentially arranged in a preset order. For example, the order can include an order in which the key-value pairs are generated. Therefore, when all the blockchain nodes respectively insert the key-value pairs K1-V1, K2-V2, and K3-V3 in the conflict data storage table, it can be ensured that each blockchain node places the key-value pair K1-V1 in the first position, places the key-value pair K2-V2 in the second position, and places the key-value pair K3-V3 in the last position; and each hash value Hn-i corresponding to the node 443 is obtained by hashing the values V1, V2, and V3 that are combined in this order: V1→V2→V3 (other orders such as V2→V1→V3 will not be used), which ensures that the hash values Hn-i of all the blockchain nodes are the same.

In summary, in the technical solutions of the present specification, a short key is supported, and when a data conflict occurs, a corresponding conflict data storage structure is configured for the leaf node. As such, all the key-value pairs that match the leaf node can be recorded, and the key-value pairs can be effectively. Actually, even though the previous 16-byte key is used, there is an extremely low probability that a same key is generated in different contract states. Therefore, for most of the key-value pairs, shorter keys are used, which saves considerable storage space.

Figure 8:
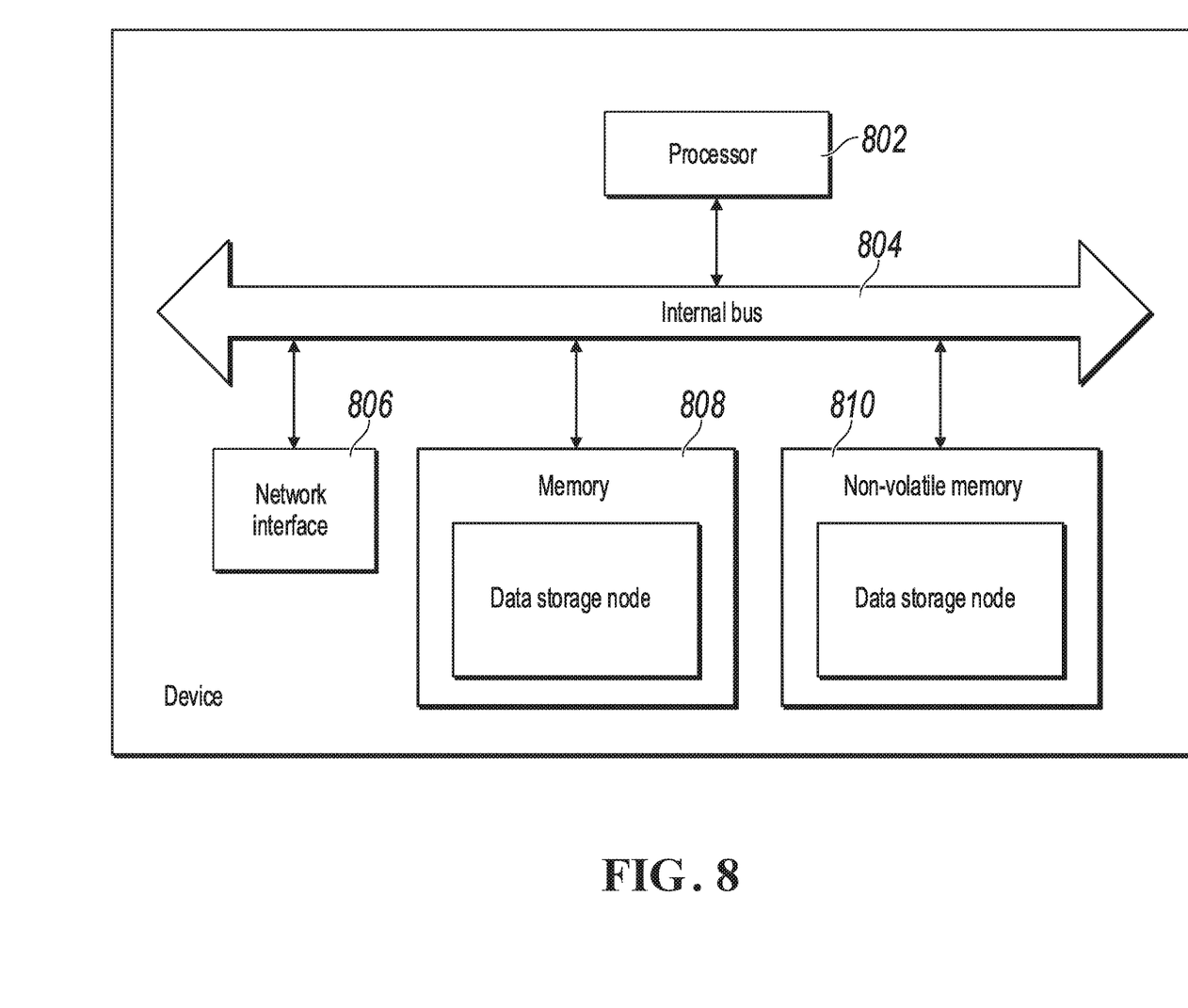
FIG. 8 is a schematic structural diagram illustrating a device, according to an example implementation of the present specification.

FIG. 8 is a schematic structural diagram illustrating a device, according to an example implementation of the present specification. Referring to FIG. 8, at a hardware level, the device includes a processor 802, an internal bus 804, a network interface 806, a memory 808, and a non-volatile memory 810, and of course, may further include other hardware required by services. The processor 802 reads a corresponding computer program from the non-volatile memory 810 to the memory 808 and then runs the computer program, to form a data storage node at a logic level. Of course, in addition to the software-based implementation, one or more implementations of the present specification can also be implemented in other manners, for example, by using a logic device or a combination of software and hardware. That is, an execution entity of the following processing process is not limited to logic units, and can also be hardware or logic devices.

Figure 9:
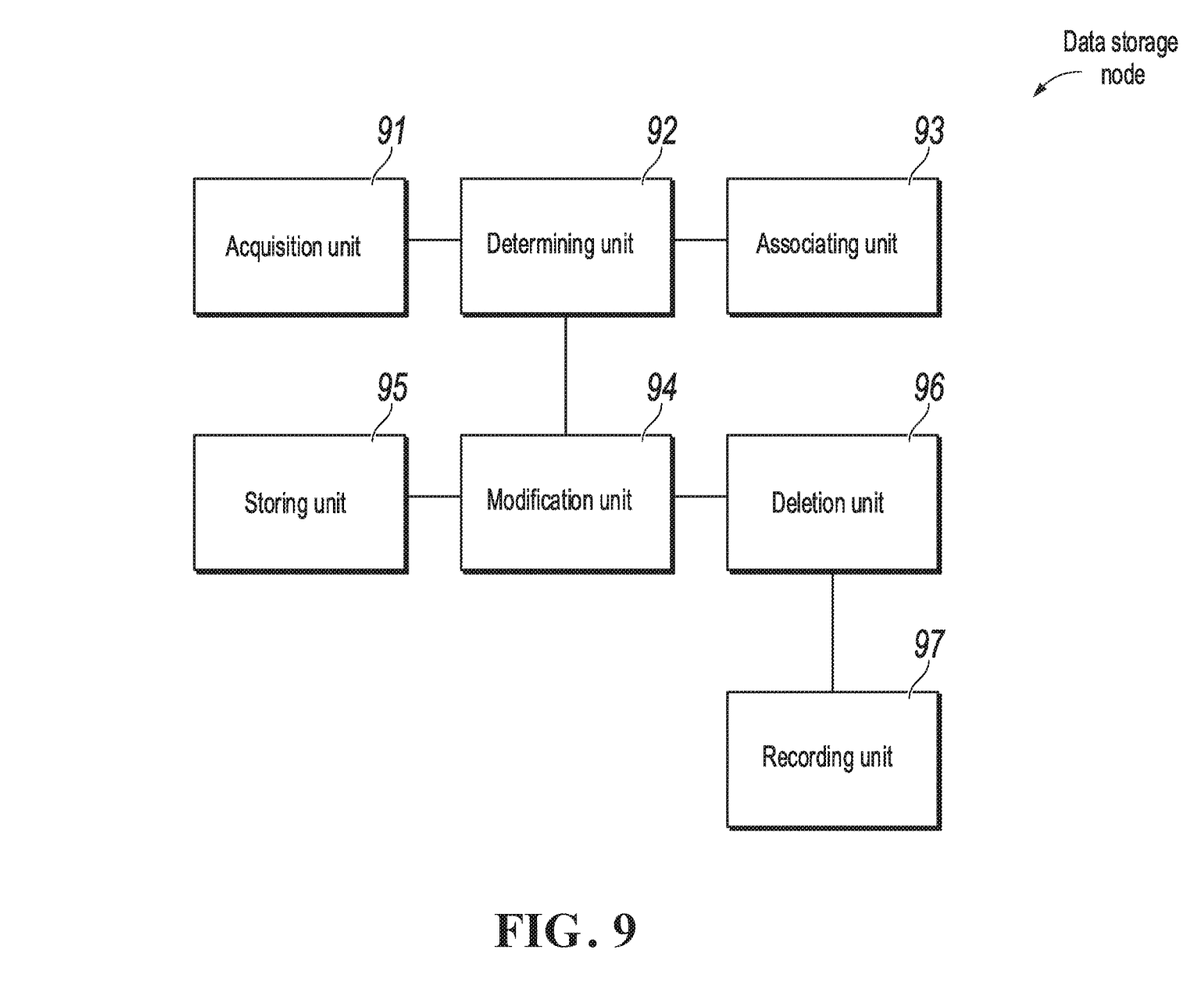
FIG. 9 is a schematic diagram illustrating a data storage node, according to an example implementation of the present specification.

Referring to FIG. 9, in the software-based implementation, the data storage node can include: an acquisition unit 91, configured to obtain, by a blockchain node, a first key-value pair corresponding to data to be stored, where the first key-value pair includes a value and a first key of the data to be stored; a determining unit 92, configured to identify, by the blockchain node, a corresponding leaf node in a tree data organization structure based on the first key, where a value of a non-leaf node in the tree data organization structure is a hash value obtained through calculation based on child leaf nodes; an associating unit, 93 configured to: when the leaf node identified by the blockchain node is not associated with an existing value, associate the value of the data to be stored with the identified leaf node, so that a value of the identified leaf node is a hash value that is obtained through calculation based on the value of the data to be stored; a modification unit 94, configured to: when the leaf node identified by the blockchain node is associated with an existing value, modify the first key, to update the first key-value pair to obtain an updated key-value pair; and a storing unit 95, configured to store the updated key-value pair into a conflict data storage structure corresponding to the identified leaf node, so that a value of the identified leaf node is a hash value that is obtained through calculation based on the value of the data to be stored and the existing value.

Optionally, the acquisition unit 91 is specifically configured to: obtain an initial key-value pair corresponding to the data to be stored, where the initial key-value pair includes the value and the first key of the data to be stored; and select a character in a particular position in the initial key to form the first key, where a length of the first key is less than that of the initial key, to obtain the first key-value pair.

Optionally, the updated key-value pair is the initial key-value pair.

Optionally, each node in the tree data organization structure has a corresponding node label; and on a path from a root node to the identified leaf node, a combination value formed by sequentially combining node labels corresponding to all nodes is equal to the first key.

Optionally, the existing value includes an existing key-value pair that is recorded in the conflict data storage structure at a historical time; and an existing key included in the existing key-value pair is different from a key included in the updated key-value pair.

Optionally, the existing value includes an existing value that is associated with the identified leaf node at a historical time.

Optionally, the following steps are also included: a deletion unit 96, configured to delete the existing value that is associated with the identified leaf node; and a recording unit 97, configured to record a second key-value pair corresponding to the existing value in the conflict data storage structure, where the second key-value pair includes the existing value and a second key, and the second key is different from a key included in another key-value pair in the conflict data storage structure.

Optionally, all key-value pairs in the conflict data storage structure are sequentially arranged in a preset order.

Optionally, the conflict data storage structure is a tree data organization structure or a table structure.

The system, device, module, or unit illustrated in the previous implementations can be implemented by using a computer chip or an entity, or can be implemented by using a product having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

In a typical configuration, a computer includes one or more processors (CPUs), input/output interfaces, network interfaces, and memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a cassette magnetic disk storage, a quantum memory, a graphene storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to note that terms "include", "comprise" or any other variant is intended to cover non-exclusive inclusion, so that processes, methods, commodities or devices that include a series of elements include not only those elements but also other elements that are not explicitly listed, or elements inherent in such processes, methods, commodities or devices. In the absence of more restrictions, elements restricted by statement that "includes a . . . ", do not preclude existence of other identical elements in the processes, methods, commodities or devices that include the elements.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The terms used in one or more implementations of the present specification are merely used for illustrating particular implementations, and are not intended to limit one or more implementations of the present specification. The terms "a", "said", and "the" of singular forms used in one or more implementations of the present specification and the appended claims are also intended to include plural forms, unless otherwise specified in the context clearly. It should also be understood that, the term "and/or" used here indicates and includes any or all possible combinations of one or more associated listed items.

It should be understood that although terms "first", "second", "third", etc. may be used in one or more implementations of the present specification to describe various types of information, the information should not be limited by these terms. These terms are only used to differentiate information of a same type. For example, without departing from the scope of one or more implementations of the present specification, first information can also be referred to as second information, and similarly, the second information can also be referred to as the first information. Depending on the context, for example, the word "if" used here can be explained as "while", "when", or "in response to determining".

The previous descriptions are merely preferred implementations of one or more implementations of the present specification, and are not intended to limit one or more implementations of the present specification. Any modification, equivalent replacement, improvement, etc., made without departing from the spirit and principles of one or more implementations of the present specification shall fall within the protection scope of one or more implementations of the present specification.

What is claimed is:

1. A computer-implemented method for storing blockchain data, comprising:

obtaining, by a blockchain node, a first key-value pair, wherein the first key-value pair comprises a first value and a first key;

identifying, based on the first key, by the blockchain node, a pre-existing corresponding leaf node in a tree data organization structure, wherein the corresponding leaf node stores an existing value in association with an existing key that matches the first key; and in response to identifying the corresponding leaf node,
modifying, by the blockchain node, the first key, to update the first key-value pair to obtain an updated key-value pair comprising the first value and the modified first key, wherein the modified first key is different from the first key and different from the existing key, calculating, by the blockchain node, a new value stored at the corresponding leaf node by hashing the first value and the existing value in a predetermined order, storing, by the blockchain node, the updated key-value pair into a conflict data storage structure, the conflict data storage structure also storing the existing value, wherein the predetermined order comprises an order of sizes of the first value and the existing value, an order in which the first value and the existing value were generated, or an order in which the first value and the existing value are positioned in the conflict data storage structure, and associating, by the blockchain node, the conflict data storage structure with the corresponding leaf node in particular, such that the updated key-value pair and the existing value, by virtue of being stored in the conflict data storage structure, are directly associated with the corresponding leaf node in particular, and wherein the conflict data storage structure and the tree data organization structure having the new value stored at the corresponding leaf node are stored on a plurality of blockchain nodes of a blockchain network, including the blockchain node.

2. The computer-implemented method of claim 1, wherein obtaining, by the blockchain node, the first key-value pair comprises:

obtaining, by the blockchain node, an initial key-value pair corresponding to the first value, wherein the initial key-value pair comprises the first value and an initial key; and truncating the initial key to form the first key, wherein a length of the first key is less than a length of the initial key.

3. The computer-implemented method of claim 2, wherein modifying the first key comprises setting the modified first key to be the initial key.

4. The computer-implemented method of claim 1, wherein the corresponding leaf node is a child node of a parent node, wherein a second leaf node is a child node of the parent node, and wherein a value stored at the parent node comprises a hash of a combination of the new value stored at the corresponding leaf node and a value stored at the second leaf node.

5. The computer-implemented method of claim 1, wherein, prior to obtaining the first key-value pair, the existing value and the existing key are stored as an existing key-value pair in the conflict data storage structure, and wherein storing the updated key-value pair into the conflict data storage structure comprises adding a new entry, the new entry comprising the updated key-value pair, to the conflict data storage structure, and increasing, by one, a stored indicator of a number of key-value pairs stored in the conflict data storage structure.

6. The computer-implemented method of claim 5, wherein the conflict data storage structure comprises a table, and wherein the stored indicator is a primary key of the table.

7. The computer-implemented method of claim 1, wherein, prior to obtaining the first key-value pair, no conflict data storage structure is associated with the corresponding leaf node, and wherein storing the updated key-value pair into the conflict data storage structure comprises:

creating the conflict data storage structure;

deleting, by the blockchain node, the existing value; and storing, in the conflict data storage structure, a second key-value pair, wherein the second key-value pair comprises the existing value and the existing key.

8. A non-transitory, computer-readable medium storing one or more instructions that, when executed by a computer system, cause the computer system to perform operations for storing blockchain data, the operations comprising:

obtaining, by a blockchain node, a first key-value pair, wherein the first key-value pair comprises a first value and a first key;

identifying, based on the first key, by the blockchain node, a pre-existing corresponding leaf node in a tree data organization structure, wherein the corresponding leaf node stores an existing value in association with an existing key that matches the first key; and in response to identifying the corresponding leaf node, modifying, by the blockchain node, the first key, to update the first key-value pair to obtain an updated key-value pair comprising the first value and the modified first key, wherein the modified first key is different from the first key and different from the existing key, calculating, by the blockchain node, a new value stored at the corresponding leaf node by hashing the first value and the existing value in a predetermined order, storing, by the blockchain node, the updated key-value pair into a conflict data storage structure, the conflict data storage structure also storing the existing value, wherein the predetermined order comprises an order of sizes of the first value and the existing value, an order in which the first value and the existing value were generated, or an order in which the first value and the existing value are positioned in the conflict data storage structure, and associating, by the blockchain node, the conflict data storage structure with the corresponding leaf node in particular, such that the updated key-value pair and the existing value, by virtue of being stored in the conflict data storage structure, are directly associated with the corresponding leaf node in particular, and wherein the conflict data storage structure and the tree data organization structure having the new value stored at the corresponding leaf node are stored on a plurality of blockchain nodes of a blockchain network, including the blockchain node.

9. The non-transitory, computer-readable medium of claim 8, wherein obtaining, by the blockchain node, the first key-value pair comprises:

obtaining, by the blockchain node, an initial key-value pair corresponding to the first value, wherein the initial key-value pair comprises the first value and an initial key; and truncating the initial key to form the first key, wherein a length of the first key is less than a length of the initial key.

10. The non-transitory, computer-readable medium of claim 9, wherein modifying the first key comprises setting the modified first key to be the initial key.

11. The non-transitory, computer-readable medium of claim 8, wherein the corresponding leaf node is a child node of a parent node, wherein a second leaf node is a child node of the parent node, and wherein a value stored at the parent node comprises a hash of a combination of the new value stored at the corresponding leaf node and a value stored at the second leaf node.

12. The non-transitory, computer-readable medium of claim 8, wherein, prior to obtaining the first key-value pair, the existing value and the existing key are stored as an existing key-value pair in the conflict data storage structure, and wherein storing the updated key-value pair into the conflict data storage structure comprises adding a new entry, the new entry comprising the updated key-value pair, to the conflict data storage structure, and increasing, by one, a stored indicator of a number of key-value pairs stored in the conflict data storage structure.

13. The non-transitory, computer-readable medium of claim 12, wherein the conflict data storage structure comprises a table, and wherein the stored indicator is a primary key of the table.

14. The non-transitory, computer-readable medium of claim 8, wherein, prior to obtaining the first key-value pair, no conflict data storage structure is associated with the corresponding leaf node, and wherein storing the updated key-value pair into the conflict data storage structure comprises:

creating the conflict data storage structure;

deleting, by the blockchain node, the existing value; and storing, in the conflict data storage structure, a second key-value pair, wherein the second key-value pair comprises the existing value and the existing key.

15. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations for storing blockchain data, the operations comprising:

obtaining, by a blockchain node, a first key-value pair, wherein the first key-value pair comprises a first value and a first key;

identifying, based on the first key, by the blockchain node, a pre-existing corresponding leaf node in a tree data organization structure, wherein the corresponding leaf node stores an existing value in association with an existing key that matches the first key; and in response to identifying the corresponding leaf node, modifying, by the blockchain node, the first key, to update the first key-value pair to obtain an updated key-value pair comprising the first value and the modified first key, wherein the modified first key is different from the first key and different from the existing key, calculating, by the blockchain node, a new value stored at the corresponding leaf node by hashing the first value and the existing value in a predetermined order, storing, by the blockchain node, the updated key-value pair into a conflict data storage structure, the conflict data storage structure also storing the existing value, wherein the predetermined order comprises an order of sizes of the first value and the existing value, an order in which the first value and the existing value were generated, or an order in which the first value and the existing value are positioned in the conflict data storage structure, and associating, by the blockchain node, the conflict data storage structure with the corresponding leaf node in particular, such that the updated key-value pair and the existing value, by virtue of being stored in the conflict data storage structure, are directly associated with the corresponding leaf node in particular, and wherein the conflict data storage structure and the tree data organization structure having the new value stored at the corresponding leaf node are stored on a plurality of blockchain nodes of a blockchain network, including the blockchain node.

16. The computer-implemented system of claim 15, wherein obtaining, by the blockchain node, the first key-value pair comprises:

obtaining, by the blockchain node, an initial key-value pair corresponding to the first value, wherein the initial key-value pair comprises the first value and an initial key; and truncating the initial key to form the first key, wherein a length of the first key is less than a length of the initial key.

17. The computer-implemented system of claim 16, wherein modifying the first key comprises setting the modified first key to be the initial key.

18. The computer-implemented system of claim 15, wherein the corresponding leaf node is a child node of a parent node, wherein a second leaf node is a child node of the parent node, and wherein a value stored at the parent node comprises a hash of a combination of the new value stored at the corresponding leaf node and a value stored at the second leaf node.

19. The computer-implemented system of claim 15, wherein, prior to obtaining the first key-value pair, the existing value and the existing key are stored as an existing key-value pair in the conflict data storage structure, and wherein storing the updated key-value pair into the conflict data storage structure comprises adding a new entry, the new entry comprising the updated key-value pair, to the conflict data storage structure, and increasing, by one, a stored indicator of a number of key-value pairs stored in the conflict data storage structure.

20. The computer-implemented system of claim 19, wherein the conflict data storage structure comprises a table, and wherein the stored indicator is a primary key of the table.

21. The computer-implemented system of claim 15, wherein, prior to obtaining the first key-value pair, no conflict data storage structure is associated with the corresponding leaf node, and wherein storing the updated key-value pair into the conflict data storage structure comprises:

creating the conflict data storage structure;

deleting, by the blockchain node, the existing value; and storing, in the conflict data storage structure, a second key-value pair, wherein the second key-value pair comprises the existing value and the existing key.

* * * * *